United States Patent [19]
Robert et al.

[11] Patent Number: 5,965,968
[45] Date of Patent: Oct. 12, 1999

[54] ELECTROSTATIC MOTOR

[75] Inventors: Philippe Robert, Fontanil; Jean-Sébastien Danel, Grenoble; Bernard Diem, Echirolles, all of France

[73] Assignee: Commissariat a l'Energie Atomique, France

[21] Appl. No.: 08/836,898

[22] PCT Filed: Nov. 29, 1995

[86] PCT No.: PCT/FR95/01578

§ 371 Date: Jul. 1, 1997

§ 102(e) Date: Jul. 1, 1997

[87] PCT Pub. No.: WO96/17430

PCT Pub. Date: Jun. 6, 1996

[30] Foreign Application Priority Data

Nov. 29, 1994 [FR] France ................................. 94 14292

[51] Int. Cl.$^6$ ................................................. H02N 1/00
[52] U.S. Cl. ........................................ 310/310; 310/309
[58] Field of Search .......................... 310/323, 40 MM, 310/800, 309, 308, 310

[56] References Cited

U.S. PATENT DOCUMENTS

| | | | |
|---|---|---|---|
| 4,181,923 | 1/1980 | Tatsumi et al. | 361/293 |
| 5,043,043 | 8/1991 | Howe et al. | 156/645 |
| 5,187,399 | 2/1993 | Carr et al. | 310/309 |
| 5,189,323 | 2/1993 | Carr et al. | 310/40 MM |
| 5,541,465 | 7/1996 | Higuchi et al. | 310/309 |

FOREIGN PATENT DOCUMENTS 0 441 269  8/1991  European Pat. Off. .

OTHER PUBLICATIONS

IBM Technical Disclosure Bulletin, vol. 22, No. 9, Feb. 1980 New York, US, pp. 4176–4177, Anonymous "Micromechanical Generation of Acoustic Waves, Feb. 1980".

"Patent Abstracts of Japan", vol. 018 No. 063 (E–1500), Feb. 2, 1994, JP,A,05 276766 (Toshiba Corporartion), Oct. 22, 1993.

"Patent Abstracts of Japan", vol. 013 No. 474 (E–836), Oct. 26, 1989, JP,A,01 186178 (Toshiba Corporation), Jul. 25, 1989.

Transducers '91, 1991 International Conference on Solid–State Sensors and Actuators, Digest of Technical Papers (Cat. No. 91CH2817–5), San Francisco, CA, USA, Jun. 24–27, 1991, ISBN 0–87942–585–7, 1991, New York, NY, USA, IEEE, USA, pp. 1056–1059, Furuhata, et al., "Array–Driven Ultrasonic Microactuators".

Journal of Microelectromechanical Systems, vol. 1, No. 1, Mar. 1, 1992, pp. 44–51, XP 000304101, Flynn, et al., "Piezoelectric Micromotors for Microrobots".

*A Study of Three Microfabricated Variable–Capacitance Motors*, M. Mehregany, S.F. Bart, Sensors and Actuators A21–A23, 1990, pp. 173–179.

*Design Considerations for Micromachined Electric Actuators*, Bart, et al., Sensors and Actuators, 14–1988, pp. 269–292.

*Permanent Magnet Micromotors on Silicon Substrates*, Wagner, et al., Journal of Microelectromechanical Systems, vol. 2, No. 1, 1993.

*Present State of the Art Ultrasonic Motors*, S. Ueha, Japanese Journal of Applied Physics, 1988, vol. 28, suppl. 28–1, pp. 3–6.

(List continued on next page.)

*Primary Examiner*—Thomas M. Dougherty
*Attorney, Agent, or Firm*—Burns, Doane, Swecker & Mathis LLP

[57] ABSTRACT

An electrostatic motor and its method of production.

This electric motor, comprising a fixed part (200, 204, 206, 208) called a stator with a deformable resilient membrane (208) and a moving part (230) called a rotor arranged on the membrane (208) and driven by deformation waves from the resilient membrane, is characterised in that it includes electrostatic means (204, 205) for deforming the membrane (208).

11 Claims, 4 Drawing Sheets

OTHER PUBLICATIONS

Piezoelectric Ultrasonic Motor, Inaba, et al., Ultrasonic Symposium, pp. 747–756, 1987.

*Ultrasonic Micromotors: Physics and Applications,* R.M. Moroney, Proceedings of the 3rd IEEE Workshop on MEMS 1990, pp. 182, 187.

"*Les Entretiens de la Technologie*" (Technology Discussions), Mar. 15–16, 1994, Paris, Subject Mechanical Engineering, Microtechnology Workshop, P. Minotti, University of Besancon (including an English abstract on the last page).

*An Introduction to Ultrasonic Motors,* Sashida, et al., Oxford Science publication, 1993, pp. 23–24.

ELECTROSTATIC MOTOR

TECHNICAL FIELD

This invention generally relates to an electrostatic motor and to its method of production. The motor of the invention can have a size of the order of a centimeter or a micrometer. Hence, the invention relates also to micromotors, that is to say motors which, because of their size, are likely to be produced according to the techniques of microelectronics. The electrostatic motors of the invention can find numerous applications in the fields of integrated optics to carry out, for example a scanning of laser beams, in medical fields, to produce, for example, microscalpels, in the field of the automobile and in a more general way for any application where movement of a small load or a microscopic load is necessary.

PRIOR ART

Motors or micromotors are usually classified either in relation to the nature of the movement that they bring about, or in relation to the physical principles that they involve.

Hence, distinction can be made between, for example, rotary micromotors and linear micromotors. Rotary micromotors are essentially made up of a fixed part that is called a stator and a rotary part in relation to the fixed part, called a rotor. Linear micromotors also comprise a moving part and a fixed part. Also, by extension, in the rest of this description, rotor will designate both the moving part of a rotary motor and that of a linear motor and stator the fixed part equally for the rotary motor and for the linear motor.

Micromotors are able to function by involving different physical principles. Hence, distinction can be made, for example, between micromotors of the electrostatic type, micromotors of the electromagnetic type and micromotors of the piezoelectric type.

In a micromotor, or an electrostatic motor, putting the rotor into motion uses electrostatic forces linked to the accumulation of charges in electrodes. Capacitive forces result from this which tend to bring together conductive plates or electrodes subjected to a difference of potential. For example, in a linear electrostatic motor, the rotor and the stator each include a series of electrodes. The electrodes of each series, that is to say that of the stator and that of the rotor are arranged periodically with a different step. The application of a voltage thereby induces a displacement of the rotor with respect to the stator.

Among the electrostatic micromotors, three categories may be distinguished mainly. A first category includes motors called "side drive motors". These motors utilise the tangential electrostatic forces on the electrodes to drive the motor. These electrostatic forces tend to align the electrodes of the rotor and of the stator. The rotor propelled by these forces rotates about a central axis. These motors permit very high rotational speeds. On the contrary, the torque of these motors and their performance are very poor, essentially because of the useful capacitive surface area of these motors and hence the useful forces, which are very small. Furthermore, the radial component of the capacitive forces, that is to say the component of the forces which is of no use for causing the motor to turn is clearly greater than the useful tangential component. This radial force induces friction and rapid wear of these motors.

A second category includes micromotors called "top drive motors". This type of motor also uses tangential electrostatic forces, but the useful capacitive surface area is situated above and below the poles of the rotor. The electric energy is stored in an air space formed by the overlapping of the poles of the stator and the rotor. To cause the motor to turn, a three phase excitation, for example, is applied to the rotor which turns around a central axis. As the capacity of this type of motor is greater, this motor can supply an interesting torque; however, vertical forces tend to hold the rotor on the poles of the stator. Hence a high vertical instability of the rotor.

A third category of micromotors includes rotary micromotors called "harmonic" or "wobble" micromotors. This category is distinguished from the two preceding categories notably by the use of radial capacitive forces. Thus the rotor turns directly on the stator. The forces involved are greater since the radial forces are greater than the tangential forces. The rotation speed is however reduced and it can be observed in addition that the rotor is strongly thrown off centre. This set over is due to the absence of lateral support of the rotor on the axis and to the attraction exerted by normal electrostatic forces. Experimental results relating to the "harmonic" micromotor show rather good performance when these motors are of a macroscopic size, that is to say of the order of a centimeter. Contrary to this, the production of these motors in accordance with the techniques of microelectronics does not give results any more satisfactory than those from "top drive" or "side drive" motors. For a more detailed and more complete description of electrostatic micromotors reference may be made, for example, to document (1) and document (2) in the references at the end of this description.

Finally, whatever their production technology, electrostatic micromotors have relatively low efficiencies. A supplementary difficulty comes from the necessity of providing a good electric contact for the moving part, that is to say, the rotor. The rotor which tends to become electrically charged must, in effect, be earthed for good operation.

It can be added that micromotors are generally of sub-millimetric size, that is to say of the order of 100 to 200 $\mu$m in diameter. The production of electrostatic motors of greater size runs into technological problems such as, for example, warping of the rotor.

Another type of known micromotor does not use electrostatic forces but electromagnetic forces. In these motors, the flowing of currents in coils induces a magnetic field which interacts with a magnet to produce a force in a direction tending to move the rotor. Only one way of producing micromotors of this type is known which uses a massive magnet that is turned around successively powered coils. The use of thin magnetic layers in a micromotor is, in effect, poorly suited to the exertion of electromagnetic forces. The deposited layers being extremely thin, that is to say less than 1 $\mu$m and the electromagnetic forces being volume forces, the forces involved are too small to drive even the rotor alone. Electrostatic type "micromotors" therefore generally have a size of the order of a millimeter. For a more detailed description of electromagnetic micromotors, reference may usefully be made to document (3) cited at the end of this description.

A third type of physical phenomenon brought into play in micromotors is the piezoelectric effect. The principle of piezoelectric motors, called ultrasonic motors, is based on a double transfer of energy. The first transfer is that from electric energy to vibrational mechanical energy by means of piezoelectric ceramics which, under the effect of electric voltages, produce either stationary or travelling waves in the stator of the motor. The second transfer corresponds to the passage of the energy of the wave from the stator to the rotor through contact forces which are exerted between these parts.

The stator of an ultrasonic motor thus includes piezoelectric elements capable, when electric excitation is applied, of deforming a resilient material, for example a layer of metallic material, deposited on the piezoelectric elements, and a rotor arranged on the resilient material. As described above, when the piezoelectric elements are excited, they create, within the resilient material, deformation waves which cause the rotor to be moved. The deformation waves can be travelling or stationary.

For piezoelectric motors in the millimetric and submillimetric ranges, it is preferable to generate deformations of membranes rather than deformations in the interior of a body of resilient material. As such, FIG. 1 gives an example of a structure of a rotary piezoelectric micromotor produced according to known microelectronics techniques. The stator of the motor in FIG. 1 comprises a membrane 1 formed by the stacking of a layer of silicon nitride 2, a platinum electrode 4 and a fine layer of piezoelectric material 6. The whole of these layers forming the membrane, rests on a thick silicon substrate 8 which has been etched in a circle to release a space 10 which permits movement of the membrane. Electrodes 12 arranged in a circle on layer 6 allow application of electric excitations to the piezoelectric material which are able to generate deformation waves in membrane 1. A rotor 14 is finally arranged on the membrane in the region that includes the electrodes 12. The rotor 14 is driven in rotation by deformation waves from membrane 1.

Such a piezoelectric motor has a certain number of advantages, amongst which a large holding torque can stop the rotor, a low supply voltage, good axial coupling through friction, since the coupling surface is equal to the section of the rotor brought into contact with the membrane and the electrodes 12 and a reduced speed of rotation which avoids a gearing system. For a more detailed description of motors of the piezoelectric type, reference may usefully be made to documents (4), (5), (6) and (7) given as references at the end of this description.

Despite their advantageous characteristics, piezoelectric micromotors also have disadvantages that relate essentially to the poor quality of the piezoelectric materials deposited in thin layers. These materials are often non-homogeneous, have a low piezoelectric effect and do not allow precise control of the deformation,wave. The result of this generally is a low deformation amplitude of the membrane. Moreover, the piezoelectric motors and micromotors operating according to a mode of alternating compression and dilation of the piezoelectric material cause large stresses in this material. These stresses cause heating up of the piezoelectric material through the Joule effect and through mechanical losses, and as a consequence an ageing of the components having a mechanical role and a modification of the parameters of the membrane (in the case of micromotors) or of the resilient body deposited on the piezoelectric material (in the case of micromotors). The result is a changing of the resonance frequency of the motor in the course of its use. This variation in resonance frequency causes a fall in efficiency which becomes more important the smaller the size of the motor.

Another constraint linked to the use of piezoelectric elements is that of control of the amplitude of the deformations of the stator. In effect, excessive deformation of the stator can damage the piezoelectric elements. These support large compressions but are very fragile under extension. Now, in deformation wave motors, the amplitude of dilation of the piezoelectric elements must be equal to that of their contraction. As the piezoelectric elements are fragile under extension, it is necessary to limit the amplitude of the deformations of the stator to a sufficiently low value and hence to be content with an ultimately limited speed of rotation and efficiency.

In order to complete the description of the state of the prior technology, reference can be made to documents (8) and (9) given as references at the end of the description which also give a general survey of the problems and limitations in the design of microactuators.

An objective of this invention is to provide a new type of motor or micromotor which does not have the disadvantages of known motors or micromotors.

Another objective of the invention is to propose a micromotor which is simple and inexpensive to produce.

DISCLOSURE OF THE INVENTION

To this effect, the invention relates, more particularly to an electric motor, comprising a fixed part called a stator with a deformable resilient membrane and a moving part called a rotor arranged on the membrane and driven by friction, by deformation waves from the resilient membrane, characterised in that it includes electrostatic means for deforming the membrane, capable of moving the rotor in a plane parallel to an at-rest plane of the membrane.

The electrostatic means of the motor of the invention do not involve any electrostatic force whatsoever being exerted between the rotor and the stator, as is the case in known electrostatic motors. The fixed part, or the stator of the motor, can include, for example, an insulating substrate fitted with a first set of electrodes arranged opposite a first face of the membrane, the electrodes being separated from the membrane by a space and working with the membrane to deform it through the exertion of electrostatic forces, the rotor being arranged against a free face of the membrane, opposite to the first face.

Spacing is understood to mean both an empty space and a space including an electrically insulating material.

When excitation voltages are applied to the electrodes of the set of electrodes, electrostatic forces exerted between the electrodes and the membrane cause a resilient deformation of the membrane and allow a deformation wave to be generated there.

According to one particular aspect of the invention, the means of deformation can be designed in order to deform the membrane according to a resonance mode of the membrane. The resonance allows a deformation amplification effect for a given excitation voltage applied to the electrodes.

One way of exciting the membrane to resonance is to supply the electrodes with an alternating voltage with a displacement of phase defined in relation to the desired deformation wave. This phase displacement is, for example, zero for a stationary deformation wave.

According to a first embodiment of the invention, the membrane can be produced in an electrically insulating material. In this case, the membrane itself includes a second set of one or several electrodes which are respectively associated with the electrodes of the first set. A periodic electric excitation voltage is then applied respectively between each electrode of the first set and the corresponding electrode of the second set on the membrane. According to another embodiment, the membrane can also be made of an electrically conductive material. In this case, the electric excitation voltages are applied periodically between respectively each electrode of the electrode set and the membrane itself.

According to the invention, the electrostatic means are therefore formed by the first set of electrodes, by the second set of electrodes (or the membrane when it is conductive) and by the means of applying a potential difference between the first set and the second set (or the membrane).

When it is wished to excite the membrane to resonance, the electrodes can be advantageously arranged at deformation antinodes of the membrane in accordance with a resonance mode of the membrane.

The precise position of the electrodes is defined notably in relation to the resonance mode that is wished to excite.

This invention can be applied to the production of not only linear, unidirectional or multidirectional motors but also to the production of rotary motors.

In the case of a linear motor, the membrane has a rectangular shape extending along a first direction X, the electrodes of the first set being parallel to one another and to a direction Y perpendicular to direction X, and arranged opposite the membrane along the direction X, in order to generate at least one stationary wave of deformation of the membrane. The first set of electrodes can be broken down into several groups of electrodes. In the particular case where the set of electrodes includes a group of electrodes at each end of the membrane, along direction X, these electrodes are capable of generating a first and a second stationary wave in the membrane. These two stationary waves are out of phase in space and in time. When the excitations applied to the electrodes correspond to the resonance frequency of the membrane, a travelling wave is observed which is propagated along the membrane in direction X. Whatever the deformation wave, a rotor placed on the membrane is driven by friction in direction X.

In the case of a multidirectional motor, the electrodes on the stator are arranged on a matrix of lines and columns which extend respectively in X and Y directions which are approximately perpendicular. The electrodes work with the membrane to generate in it travelling or stationary deformation waves.

Finally, in order to produce a rotary motor, the electrodes are arranged in a circle on the support and work with the membrane to generate in it a deformation wave with circular symmetry.

Whatever the displacement mode desired, in order to produce motors or micromotors with deformation waves of the stationary type, periodic protuberances can also be associated with the membrane as in the known case of piezoelectric macromotors (4, 8).

The motor of the invention is particularly suited to be manufactured in accordance with known microelectronics techniques and notably for manufacture in silicon.

In this case, the method of fabrication of the stator of the motor essentially includes the following steps:

a) creating a structure comprising, on a non-conductive substrate, in that order, a first set of electrodes, a sacrificial layer and a first layer, b) etching the first layer in order to form at least one opening for access to the sacrificial layer, c) isotropic etching of the sacrificial layer through the opening in order to free locally, the first layer which forms the deformable membrane, d) producing electric contacts on the membrane and on the electrodes.

The first set of electrodes can be produced either by deposition of conductive material onto the substrate before the creation of the sacrificial layer, or by ion implantation into the substrate directly or through the upper layer(s). By non-conductive substrate, it is meant a substrate that is either insulating or is made of a semiconductor material or is a conductive substrate covered by an insulating layer.

According to one advantageous embodiment of the invention in silicon technology, step a) for producing the sacrificial layer and the first layer comprises:

an implantation of oxygen into a silicon substrate in order to create a buried layer of silicon oxide forming the sacrificial layer and a silicon film situated above said sacrificial layer, a silicon epitaxy from said film in order to form the first layer.

According to another advantageous embodiment of the invention, in silicon technology, step a) for producing the sacrificial layer and the first layer comprises:

a thermal oxidation of the silicon substrate in order to form the sacrificial layer, a silicon epitaxy from the sacrificial layer in order to form the first layer.

or formation of this layer of silicon by sealing up a silicon substrate and burnishing it in order to adjust this layer of silicon to the desired thickness.

When the membrane is produced in a non-conductive material, a second set of electrodes is produced either by deposition on the first layer or by ion implantation in this layer in order to produce electrodes on the upper or lower surface of said layer.

According to one embodiment of the invention, in order to produce the rotor, the following steps are carried out:

formation of a first sacrificial layer on the membrane, formation of a layer of material on this sacrificial layer, etching of the layer of material in order to define the geometry of the rotor, removal of the sacrificial layer in order to free the rotor.

In the case of a rotary motor, for example, the rotor can also be produced according to fabrication techniques known in microelectronics. It comprises, for example, the following steps:

a) formation of a first sacrificial layer on the membrane of the stator, b) etching a recess in the sacrificial layer in the form of ring facing the electrodes of the stator, c) formation of a first layer of material on the sacrificial layer and in the recess, d) etching the first layer to define the rotor parallel to the membrane, e) formation of a second sacrificial layer around the first layer of material, f) formation of a second layer of material around the second sacrificial layer, g) creation of an opening in the second layer of material to bring the sacrificial layer to the surface and to define an end piece for the rotor, h) isotropic etching of the first and second sacrificial layers in order to free the rotor.

Other characteristics and advantages of the invention will appear more clearly from the following description, with reference to the appended drawings, given purely for information and being non-limitative.

DETAILED DESCRIPTION OF EMBODIMENTS OF THE INVENTION

Elements with the same function in FIGS. 2 to 7 bear reference numbers the tens and units of which correspond.

Figure 1:
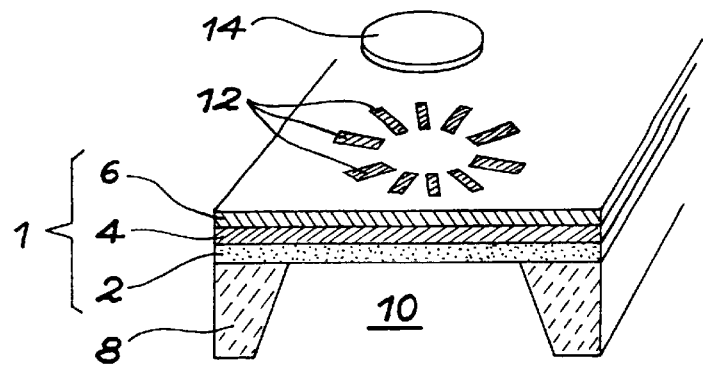
FIG. 1, already described, is a diagrammatic perspective view of a piezoelectric micromotor of a known type.
Figure 2:
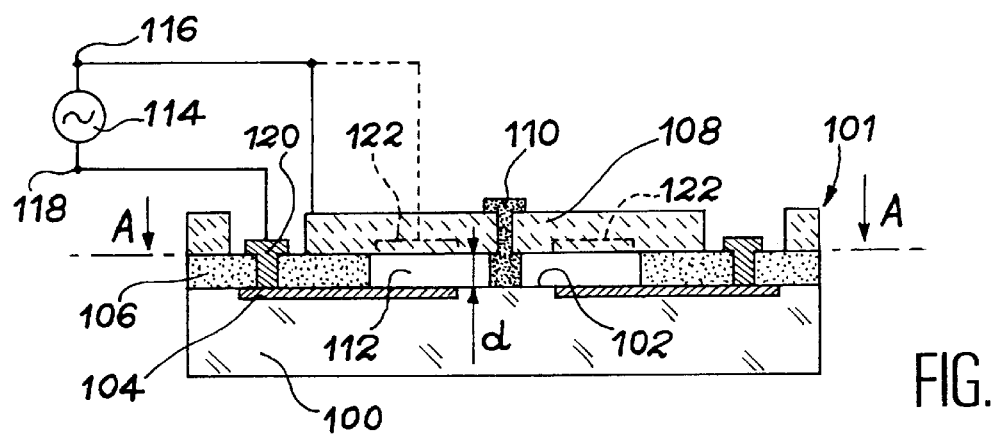
FIG. 2 is a diagrammatic view, in section, of a stator of a micromotor according to the invention.

FIG. 2 gives an example of a stator of a micromotor according to the invention which has been produced according to the techniques of microelectronics. The stator 101 shown in FIG. 2 comprises a substrate 100 with a surface 102 in which electrodes 104 are embedded. A prop 106 made of silicon oxide is supported on the surface 102 and holds a membrane 108 at a distance d from the surface 102 of the substrate. The membrane is linked to the substrate through the prop 106 as well as by a central plug 110 forming a chamber 112 between the membrane 108 and the substrate 100. When the membrane 108 is produced in an electrically conductive material, periodic excitation voltages can be applied respectively between the embedded electrodes 104 and the membrane. Means of applying these voltages, including a voltage generator 114 are represented very schematically. The terminals 116, 118 of the generator 114 are respectively connected to the membrane 108 and to contact points 120 of the embedded electrodes 104. In the particular case where the membrane 108 is produced in an electrically insulating material, this can also include electrodes 122 produced on the surface turned towards the substrate. The electrodes 122 are respectively linked to the electrodes 104 of the substrate. In FIG. 2, the electrodes 122, which correspond to a variant of the embodiment of the motor are represented by broken lines.

Figure 3:
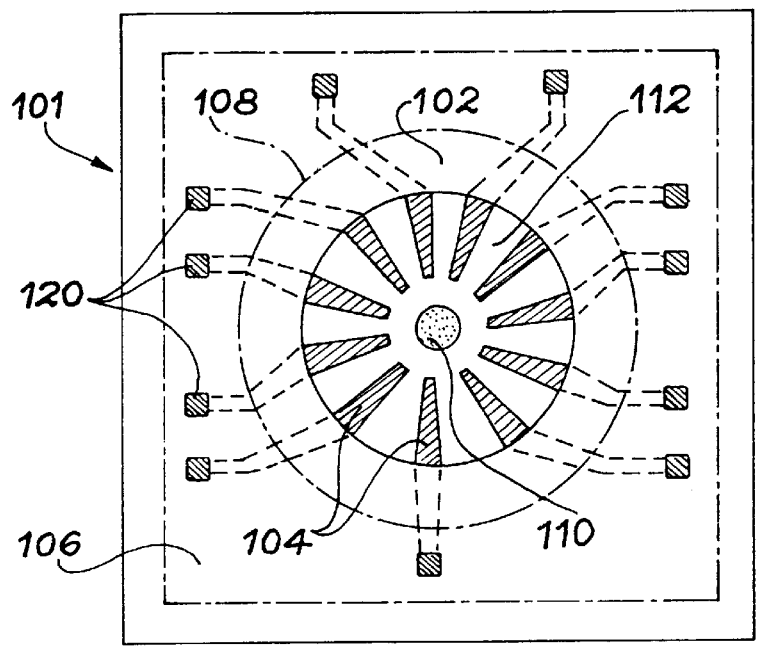
FIG. 3 is a diagrammatic section A—A of the stator of a micromotor according to the invention.

FIG. 3 is an A—A section of the device in FIG. 2 and shows the circular arrangement of the electrodes 104. The electrodes 104 are arranged on the surface 102 of the substrate in the chamber 112 which is laterally bounded by the prop 106. In a peripheral region of the prop 106, turned towards the outside of the stator, the electric contact points 120 are formed allowing voltages to be applied to the embedded electrodes 104.

Figure 4:
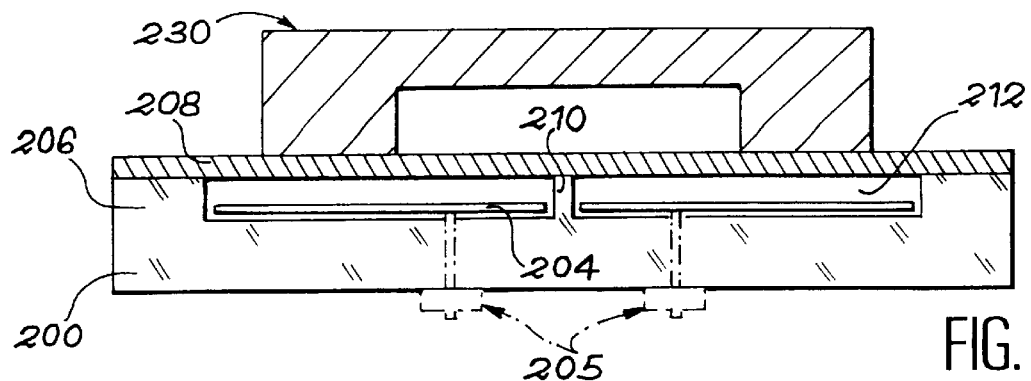
FIG. 4 is a diagrammatic section view of a macroscopic embodiment of the motor according to the invention.

FIG. 4 gives an example of a macroscopic embodiment of a motor according to the invention. The motor comprises a substrate 200 which is a ceramic plate in which a circular recess 212 is formed, for example, by machining. A membrane of metal-coated polymer 208 covers the machined ceramic plate to form the stator. It is held, for example, by sticking, by a circular side edge 206 of the ceramic plate and by a central point 210.

While the thickness of the membrane of the motor in FIG. 2 is of the order of a micrometer and that of the substrate of the order of a few hundreds of micrometers, the thickness' of the corresponding parts of the "macroscopic" motor, that is to say the ceramic plate 200 and the membrane 208 are respectively of the order of a centimeter and of a hundred micrometers. In the recess 212, a printed circuit is arranged with electrodes 204 which face the membrane 208. The printed circuit is held on the ceramic plate with the help of a fixing system 205 which can also allow contact to be made. The rotor 230 of the motor is an aluminium component simply arranged on the membrane 208. The choice of material is not however very critical since the rotor does not provide any electric or mechanical function whatsoever. It is simply driven by the deformation waves created in the membrane 208 under the effect of electromagnetic fields obtained by applying corresponding voltages between the electrodes and the membrane.

Figure 5:
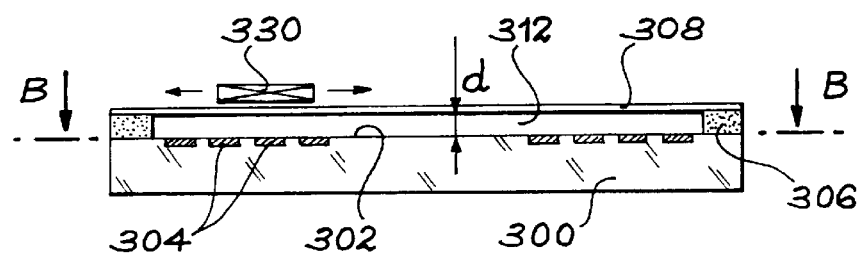
FIG. 5 is a section view of a linear motor according to the invention.
Figure 6:
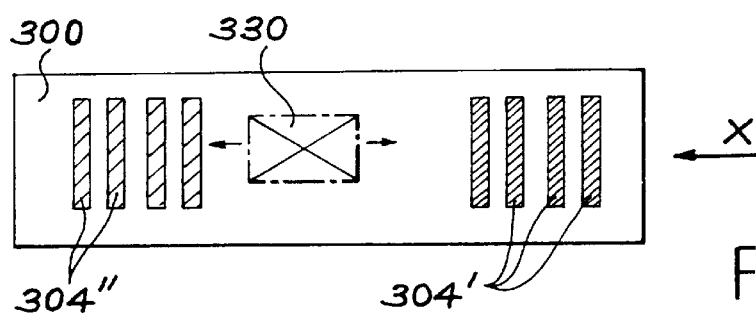
FIG. 6 is a section B—B of the linear motor in FIG. 5.
Figure 7:
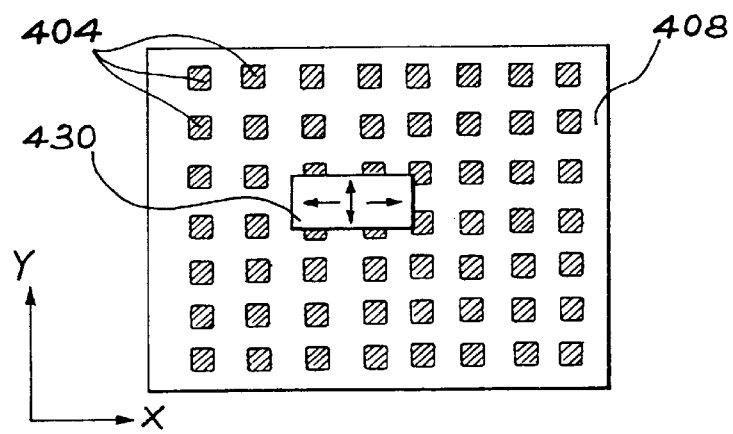
FIG. 7 is a top view of a multidirectional micromotor according to the invention.

While FIGS. 2, 3 and 4 relate more particularly to a rotary motor, FIGS. 5, 6 and 7 relate to a linear motor.

In FIG. 5, elements similar to those in the preceding Figures can be seen, in particular, a silicon substrate 300 with a surface 302 in which electrodes 304 are formed. A prop 306 allows the membrane 308 to be held at a distance d from the surface 302. Hence, a space 312 separates the membrane 308 and the surface 302 of the substrate 300. A parallelepiped shaped rotor 330, made, for example, of glass or silicon, is arranged on the membrane 308. For reasons of clarity, FIG. 5 does not show the contact points on the electrodes.

As may be seen more clearly in FIG. 6, the substrate includes in fact two series of electrodes 304' and 304" arranged in regions respectively at the ends along the X axis of the membrane 308. Each of these series of electrodes allows the generation of a stationary wave on the membrane. These two stationary waves have a displacement of phase in space and in time. If the phase displacement is $\pi/2$ in time and $3\lambda/4$ in space ($\lambda$=the wavelength of the deformation wave), the result is a travelling wave on the membrane which allows the rotor 330 arranged on the membrane 308 to move along the X axis.

FIG. 7 permits illustration of another embodiment variant of the invention for a micromotor called a multidirectional micromotor. This motor operates in the same manner as the linear motor, but the electrodes 404 are arranged in a matrix of columns and lines along the directions marked X and Y on the Figure. For reasons of clarity, the Figure only shows the siting of the electrodes 404 and the location of the membrane 408. A rotor 430 arranged on the membrane can be moved by travelling or stationary waves generated in the membrane 408 along the two orthogonal directions X and Y. With regard to the movement of a rotor on a deformable membrane, of a linear motor, or a multidirectional motor, reference may usefully be made to the document (6) given as a reference at the end of the description.

Figure 8:
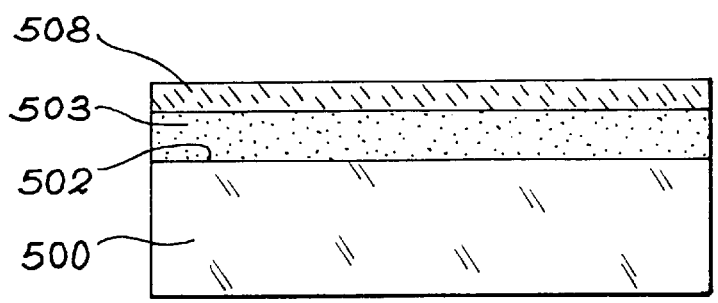
FIGS. 8A, 8B and 8C are diagrammatic sections illustrating the steps in the production of the stator of a rotary micromotor according to the invention.
Figure 8:
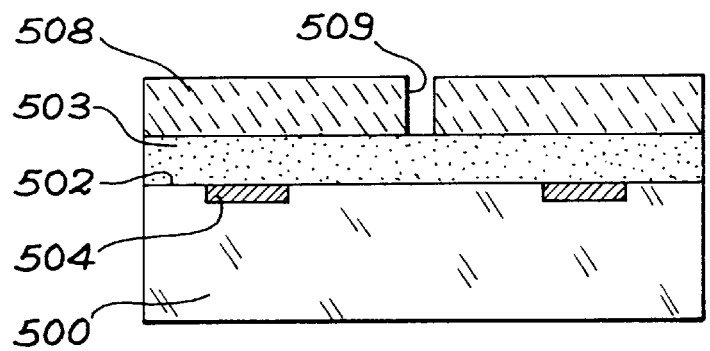
Figure 8:
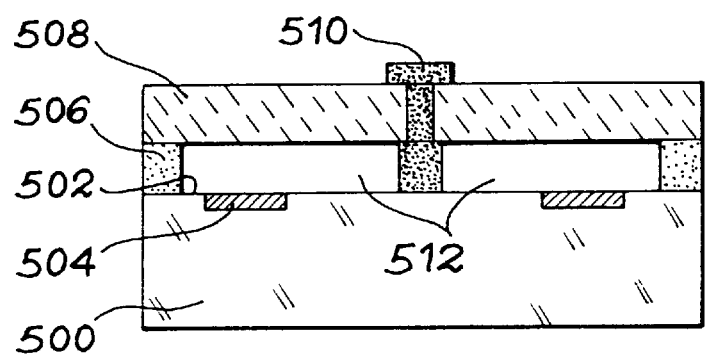

The micromotors and the motors of the invention can be produced according to different techniques already known in the field of microelectronics. FIGS. 8A to 8C give, by way of an example, a method of producing these motors. A first step consists of creating a structure such as that shown in FIG. 8A. This includes a thick substrate, for example, made of silicon, which bears reference number 500. On a surface 502, the substrate supports, in order, a layer 503 of silicon oxide with a thickness of the order of 0.4 $\mu$m, then a layer 508 of silicon of thickness of the order of 0.2 $\mu$m. This structure is produced, for example on a silicon substrate by the techniques previously described.

Electrodes 504 are formed at the surface 502 of the substrate 500, for example, by ion implantation, through a mask, which passes through layers 508 and 503. This step is illustrated notably in FIG. 8B. The production of the stator of the motor is continued by the formation by epitaxy of a layer of silicon on the layer 508 so as to increase the thickness of it. The thickened layer 508 forms the future membrane of the stator which bears the same reference number. The layer 508 is then etched, for example by dry etching so as to form in it an access opening 509 to reach the silicon oxide of layer 503. A wet etching of the silicon oxide through the opening 509 then permits the release of the membrane. A cavity 512 is thus formed visible in FIG. 8C.

The membrane 508 is held on the substrate by a prop 506. The prop 506 results from a part of the layer 503 which has not been removed during the wet etching of the silicon oxide. The production of the stator can be continued by the deposition of a plug 510 for example, made of silicon nitride, at the centre of the membrane to fill in the opening 509 and make the membrane rigid by being supported on the surface 502 of the substrate. The plug 510 can be produced, for example by chemical deposition in the vapour phase. The production of the stator is concluded by the formation of electric contacts (produced in classic fashion by the formation of openings with metal coating) on the membrane 508 and on the electrodes 504. These electric contacts are not represented for reasons of clarity of the Figures.

It should be noted that in a configuration where the membrane 508 is made of an electrically insulating material, the fabrication of the stator is completed by the formation of one or several electrodes on the membrane 508, corresponding to the electrodes 504 of the substrate. When the stator of the motor is ready, the production of the motor can be continued by the fabrication of the rotor.

Figure 9A:
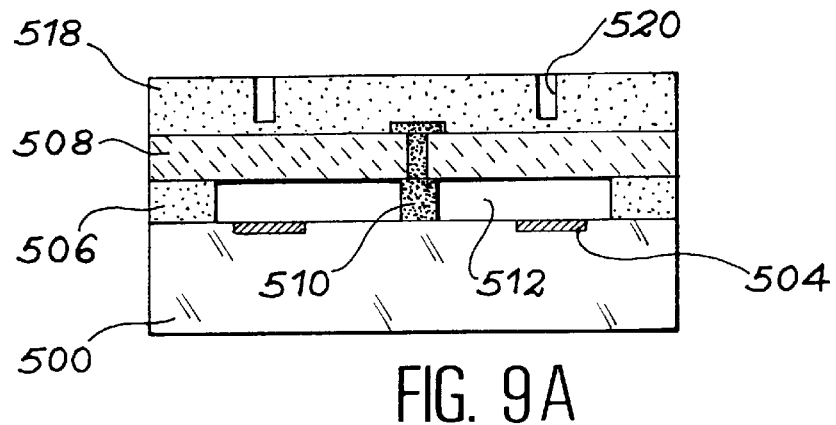
FIGS. 9A, 9B and 9C are diagrammatic sections illustrating the steps in the production of the rotor of a rotary micromotor according to the invention.
Figure 9B:
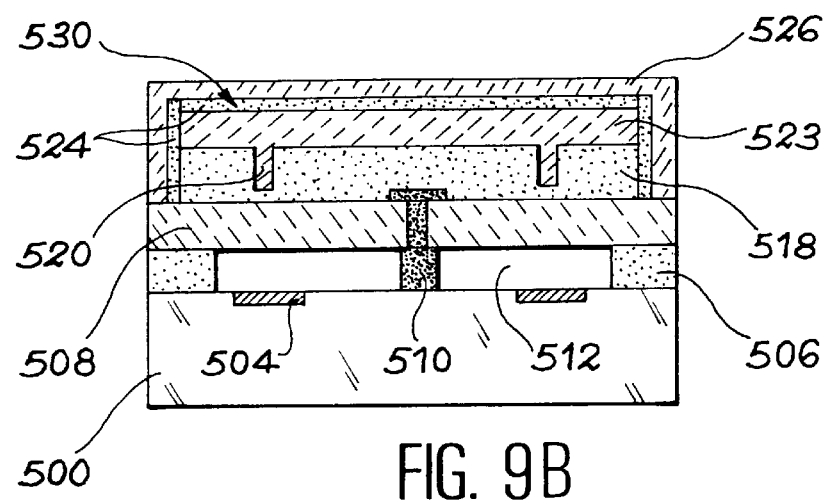
Figure 9C:
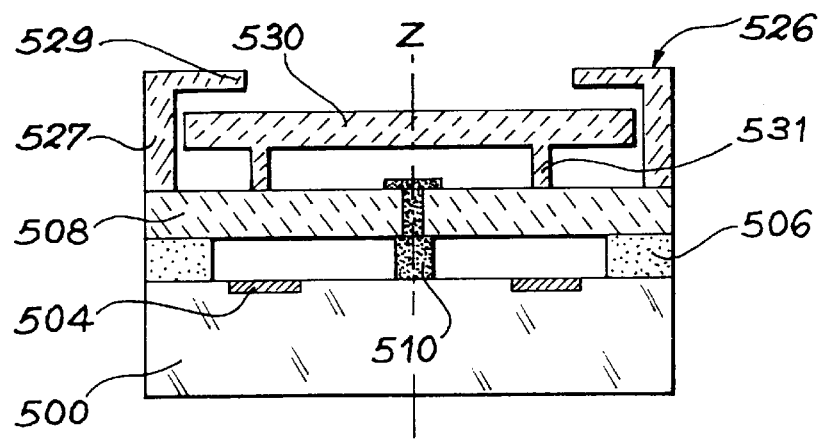

The steps in the fabrication of the rotor are illustrated in FIGS. 9A to 9C for the particular case of a rotary motor. These steps include the deposition of a sacrificial layer 518, for example of silicon oxide, onto the membrane 508 of the stator. A recess 520, in the form of a ring and with a depth of the order of 2 $\mu$m is then etched, for example by wet etching, in the layer 518 opposite the electrodes 504. These steps are shown notably in FIG. 9A.

The fabrication of the rotor is continued by the deposition of a layer 523, for example of silicon, on layer 518 and in the recess 520. This layer of silicon 523 of a thickness of a few $\mu$m constitutes the future rotor 530. This layer is then etched as is the sacrificial layer 518 in order to define the diameter of the rotor 530. A second sacrificial layer 524 is then formed around the etched layers 518 and 523. A layer 526 of silicon surrounding layer 524 then forms a capsule which extends to the membrane 508 and which encloses the rotor 530. The structure thus obtained is represented in FIG. 9B.

Layer 526 is then etched locally opposite plug 510, for example by dry etching so as to expose the silicon oxide of layer 524. The dry etching of the silicon of layer 526 is followed by a selective wet etching of the silicon oxide of layers 524 and 518 which allows the rotor 530 to be freed.

The motor represented in FIG. 9C is obtained. The rotor is held on the membrane 508 while rotationally mobile by means of etched layer 526 the flanks of which 527 prevent lateral displacement of the rotor on the membrane and the upper flange of which 529 prevents axial displacement of the rotor which would be separated from the membrane.

The rotor 530 is supported on the membrane 508 by a circular ring 531 obtained by moulding in the recess 520 etched in the layer 518 (see FIG. 9B).

When the electrostatic forces are created between the membrane 508 and the substrate 500, by the effect of excitation voltages applied between the membrane 508 and the electrodes 504, a circular wave is formed in the membrane. The rotor is then driven in rotation about an axis Z passing through the central plug 510.

Finally, thanks to the invention motors with high torque are obtained which do not have the disadvantages of known micromotors. It is possible, in effect to break free from the quality of the active materials, to simplify the methods of fabrication, and also to obtain a better and more easily controllable electromechanical coupling; a good electromechanical coupling being understood as mechanical deformation of the membrane directly linked to the voltage applied to the electrodes.

REFERENCES FOR THE DOCUMENTS MENTIONED IN THIS DESCRIPTION (1) A Study of Three Microfabricated Variable-capacitance Motors
M. Mehregany, S. F. Bart
Sensors and Actuators A21–A23, 1990, pp 173–179
(2) Design Considerations for Micromachined Electric Actuators
S. F. Bart, T. A. Lober,
Sensors and Actuators, 14- 1988, pp. 269–292
(3) Permanent Magnet Micromotors on Silicon Substrates
B. Wagner, M. Kreutzer
Journal of Microelectromechanical Systems, Vol. 2, No. 1, 1993
(4) Present State of the Art of Ultrasonic Motors
S. Ueha
Japanese Journal of Applied Physics, 1988, Vol. 28 suppl. 28-1, pp. 3, 6
(5) Piezoelectric Ultrasonic Motor
R. Inaba, A. Tokushima
Ultrasonic Symposium, pp. 747–756, 1987
(6) Piezoelectric Micromotors for Microrobots
A. M. Flynn, L. S. Tavrow
Journal of Microelectromechanical Systems, Vol. 1, No. 1, 1992
(7) Ultrasonic Motors: Physics and Applications
R. M. Moroney
Proceedings of the 3rd IEEE Workshop on MEMS 1990, pp. 182, 187
(8) Les "entretiens de la technologie" (Technology Discussions), Mar. 15/16, 1994, Paris, Subject Mechanical Engineering, Microtechnology Workshop, P. Minotti, University of Besançon.
(9) An Introduction to Ultrasonic Motors
T. Sashida, T. Kenjo
Oxford Science Publication, 1993, pp. 23–24

We claim:

1. An electric motor, comprising a fixed part (101) called a stator, a deformable resilient membrane (108, 208, 308, 408, 508) movably supported relative to the stator, and a moving part (230, 330, 430, 530) called a rotor arranged on the membrane and driven by friction between the rotor and the membrane, the friction being imparted by deformation waves in the resilient membrane, characterised in that it includes electrostatic means (104, 114, 122, 204, 304, 404, 504) for generating said deformation waves in said resilient membrane such that the rotor is moved in a plane parallel to an at-rest plane of the membrane.

2. The electric motor according to claim 1, characterised in that the electrostatic means comprise electrodes biased such that deformation of the membrane is in accordance with a resonance mode of the membrane.

3. The electric motor according to claim 1, characterised in that the fixed part comprises an insulating substrate (100, 200, 300, 400, 500) fitted with a first set of electrodes (104, 204, 304, 404, 504) arranged opposite a first face of the membrane, the electrodes being separated from the membrane (108, 208, 308, 408, 508) by a space (112, 212, 312, 512) and working with the membrane to deform it through the exertion of electrostatic forces, the rotor being arranged against a free face of the membrane, opposite to the first face.

4. The motor according to claim 3, characterised in that the membrane (108, 208, 308, 408, 508) is made of an electrically conductive material, and a periodic electric excitation voltage is applied respectively between each electrode (104, 204, 304, 404, 504) and the membrane.

5. The motor according to claim 3, characterised in that the membrane (108, 208, 308, 408, 508) is made of an electrically insulating material, and includes a second set of one or several electrodes (122) respectively associated with the electrodes (104) of the first set of electrodes, a periodic electric excitation voltage being applied respectively between each electrode (104) of the first set of electrodes and an electrode (122) associated with the second set of electrodes.

6. The motor according to claim 5, characterised in that the electrodes are arranged at antinodes of deformation of the membrane according to a resonance mode of the membrane.

7. An electric motor according to claim 3, characterised in that it is linear and it includes a rectangular membrane (308) extending in a direction X, the electrodes of the first set being parallel to one another and in a direction Y perpendicular to direction X, and arranged opposite the membrane (308) along the direction X, in order to generate at least one stationary wave of deformation of the membrane.

8. An electric motor according to claim 3, characterised in that it is multidirectional and that the electrodes of the first set are arranged along a matrix of lines and columns of electrodes (404) extending respectively along directions X and Y approximately perpendicular, the electrodes (404) working with the membrane to generate in it traveling or stationary deformation waves through selective biasing of the electrodes of the first set to thereby generate motion of the rotor along a plane substantially parallel to the matrix.

9. An electric motor according to claim 3, characterised in that it is rotary and that the electrodes (104) of the first set of electrodes are arranged in a circle on the substrate (100) and work with the membrane (108) to generate in it a deformation wave with circular symmetry.

10. An electric motor, comprising:
a fixed stator (101) having a deformable resilient membrane (108, 208, 308, 408, 508); and
a moving rotor (230, 330, 430, 530) arranged on the membrane and driven by friction, by deformation waves from the resilient membrane,
characterized in that the motor includes electrostatic means (104, 114, 122, 204, 304, 404, 504) for deforming the membrane through exertion of electrostatic forces between a substrate and the membrane and capable of moving the rotor in a plane parallel to an at-rest plane of the membrane.

11. An electric motor, comprising:
a fixed stator (101) having a deformable resilient membrane (108, 208, 308, 408, 508); and
a moving rotor (230, 330, 430, 530) arranged on the membrane and driven by friction, by deformation waves from the resilient membrane,
characterized in that the motor includes electrostatic means (104, 114, 122, 204, 304, 404, 504) for deforming the membrane and capable of moving the rotor in a plane parallel to an at-rest plane of the membrane,
wherein the stator further comprises an insulating substrate (100, 200, 300, 400, 500) fitted with a first set of electrodes (104, 204, 304, 404, 504) arranged opposite a first face of the membrane, the electrodes being separated from the membrane (108, 208, 308, 408, 508) by a space (112, 212, 312, 512) and working with the membrane to deform it through the exertion of electrostatic forces, the rotor being arranged against a free face of the membrane opposite to the first face.

* * * * *